W. ROBERTS.
Corn-Coverer.

No. 31,130.

Patented Jan. 15, 1861.

Witnesses:

Inventor:
W. Roberts
per Munn & Co
attorneys.

UNITED STATES PATENT OFFICE.

WASHINGTON ROBERTS, OF ROCHEPORT, MISSOURI.

IMPROVEMENT IN COVERING-PLOWS.

Specification forming part of Letters Patent No. 31,130, dated January 15, 1861.

*To all whom it may concern:*

Be it known that I, WASHINGTON ROBERTS, of Rocheport, in the county of Boone and State of Missouri, have invented a new and Improved Covering-Plow; and I do hereby declare that the following is a full, clear, and exact description of the same, reference being had to the accompanying drawings, forming part of this specification, in which—

Figure 1:
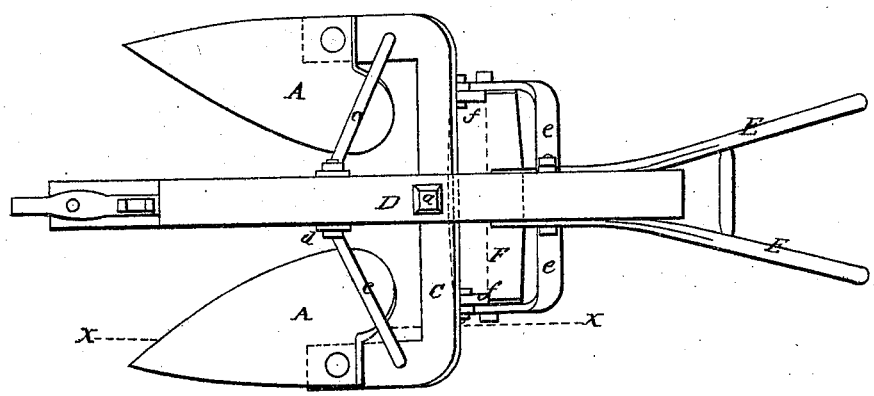
Figure 2:
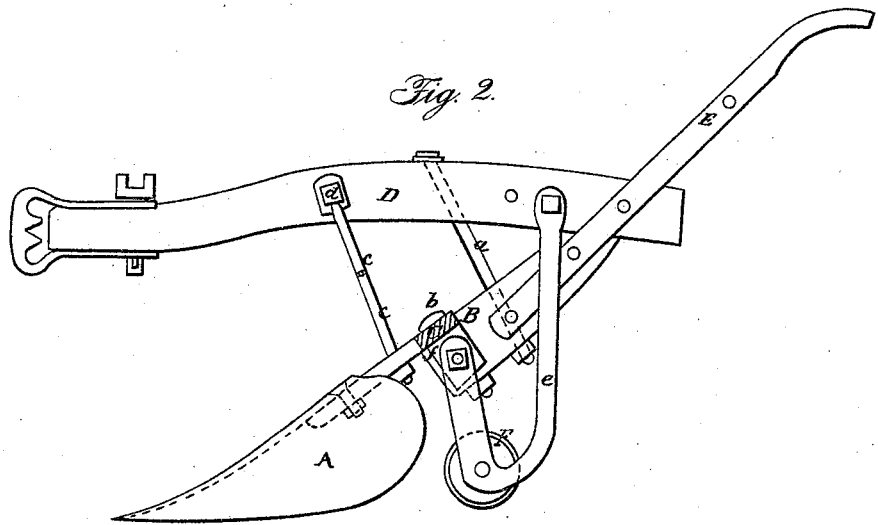

Figure 1 represents a plan or top view of my invention. Fig. 2 is a longitudinal vertical section of the same, taken in the plane indicated by the line $x\, x$, Fig. 1.

Similar letters in both figures refer to corresponding parts.

The object of this invention is to provide simple and effective means to cover the seed and to press down the ground upon it by one operation; and it consists in the combination of two inwardly-flaring shares attached in an inclined position to the standard of a plow, with a pressing-roller arranged close behind the shares and supported by pendants, which at the same time form braces for the shares.

To enable others skilled in the art to make and use my invention, I will proceed to describe its construction and operation with reference to the drawings.

Two shares, A, are secured to the standard B by means of a doubly-bent arm, C. The shares are flaring inwardly, and the standard C is attached to the beam D in an inclined position, as clearly shown in Fig. 2. It is braced by a rod, $a$, and firmly attached to its sides are the handles E. The arm C is secured to the standard B by means of a screw-bolt, $b$, and it is steadied in its position by braces $c$, which are fastened to the sides of the beam by means of a screw-bolt, $d$, and which extends in an inclined position to the ends of the arms, as clearly shown in the drawings.

Behind the shares and supported by pendants $e$ is the pressing-roller F, and the pendants $e$ are secured with one end to the beam and with the other to the lugs $f$, which project downward from the arm C. By these means said pendants form additional braces for the arm C, and they form firm and substantial bearings for the roller.

This plow is used for covering such seed which is sown in hills or drills, and the shares are made to straddle the rows, so that they throw the dirt over the seed from both sides, and the roller, which follows close behind the shares, presses the ground firmly down upon the seed. By these means the seed is covered up perfectly even, and by pressing the ground down upon it it is protected against the influence of the rain or against the action of birds. This roller also serves to regulate the depth to which the shares cut into the ground; and by taking off the shares and putting on others of a different form the plow can be changed to a cultivator.

This plow is very simple in its construction, it is strong and durable, and it can be operated with great ease and convenience.

Having thus fully described my invention, what I claim as new, and desire to secure by Letters Patent, is—

The arrangement of the inwardly-flaring shares A, attached by means of the arm C to the inclined standard B, in combination with the pressing-roller F, supported by pendants $e$, the whole being constructed and operated as and for the purpose set forth.

WASHINGTON ROBERTS.

Witnesses:
 THOS. M. SMITH.
 J. F. SHINDLER.